United States Patent [19]

Patrick

[11] Patent Number: 4,738,774
[45] Date of Patent: Apr. 19, 1988

[54] SPOUT LINE BUSTER

[76] Inventor: Charles W. Patrick, 800 State St., Apt. 221, West Columbia, S.C. 29169

[21] Appl. No.: 917,668

[22] Filed: Oct. 10, 1986

[51] Int. Cl.$^4$ .............................................. B07B 1/00
[52] U.S. Cl. .................... 209/236; 209/240; 193/3; 193/14; 193/32; 198/534; 414/299; 414/303
[58] Field of Search ................. 193/3, 2 A, 9, 29, 14, 193/32; 209/236, 240; 414/299, 303, 288, 133, 144; 198/534, 537; 222/502, 547, 564

[56] References Cited

U.S. PATENT DOCUMENTS

| 118,334 | 8/1871 | Brady et al. | 209/240 |
|---|---|---|---|
| 832,400 | 10/1906 | Lyons . | |
| 1,047,316 | 12/1912 | Sicka . | |
| 1,808,587 | 6/1931 | Adams | 193/3 |
| 1,955,038 | 4/1934 | Walker et al. | 193/2 |
| 3,232,416 | 2/1966 | Winter | 198/43 |
| 3,409,187 | 11/1968 | Socha | 222/459 |
| 3,572,523 | 3/1971 | Cymara | 214/17 |
| 4,377,230 | 3/1983 | Bürkner | 198/525 |
| 4,400,268 | 8/1983 | Stache et al. | 209/236 |
| 4,472,102 | 9/1984 | Behringer | 193/3 X |
| 4,572,782 | 2/1986 | Smith et al. | 209/236 |

FOREIGN PATENT DOCUMENTS 59-93811 5/1984 Japan ...................... 193/14

*Primary Examiner*—Joseph E. Valenza
*Assistant Examiner*—Jonathan D. Holmes
*Attorney, Agent, or Firm*—Benoni O. Reynolds

[57] ABSTRACT

An apparatus for loading open top grain hopper rail cars and trucks which eliminates the buildup of a core of small material and grains directly beneath the load out spout. Also, the grain will not build up heat as easily with the core eliminated and a more representative sample, for grading purposes, can be obtained from the hopper car or truck. The spout line buster is a small, stove-shaped chamber which attaches to the end of a grain load out spout and is lowered about six inches into the hopper rail car or truck being loaded. The grain passes through the down spout and enters the spout line buster where the flow of the grain is directed and slowed by a series of baffles or flow guides. In the model designed for loading hopper rail cars, the grain strikes a screen assembly consisting of a cone screen and two diagonal screens. Small material, such as broken grain and weed seed, passes downwardly through the screens, striking a metal deflector at the bottom, where the material is deflected to the sides of the hopper rail car and away from the center. The whole grain is deflected by the diagonal screens of the spout line buster along its path of movement and directly beneath the access door of the hopper rail car. The model for loading trucks performs the same functions but has only two baffles, a single diagonal screen and a single discharge port.

4 Claims, 2 Drawing Sheets

SPOUT LINE BUSTER

BACKGROUND OF THE INVENTION

1. Field of the Invention

This invention relates to apparatus for loading grain into open top hopper rail cars or into trucks. Specifically, it relates to an apparatus which attaches to the load out spout of a grain loader for controlling the segregation and distribution of grain while loading such rail cars or trucks.

2. Description of Prior Art

When using a conventional load out spout in loading open top hopper rail cars or trucks, a buildup or core of small materials occurs directly under the load out spout. This buildup creates problems both from a safety and economic viewpoint. The core of small materials causes heat to build up in the core area as air cannot freely circulate between the particles of broken grain and weed seed. Secondly, as the grader of the load takes his samples from the center of the hopper rail car to determine the value of the grain, the samples taken are not representative of the true quality of the grain load as a whole. Thus, the seller of the grain takes an economic loss due to the manner in which a conventional load out spout distributes the grain within the hopper rail car. The present invention eliminates both of these fundamental problems by distributing the whole grain and small materials more evenly, whether loading a hopper rail car or a truck.

The use of baffles and deflectors is not new to the art but often they were used for different purposes than in the present invention. Lyons, in 1906 (U.S. Pat. No. 832,400), invented a grain mixer in which differing grades of grain were fed through a structure of multiple triangular rods to make a more homogenous mixture. A conical deflector first appeared in Sicka's feed mixer and distributor in 1912 (U.S. Pat. No. 1,047,316). He used the apex of a cone shaped spreader, opposing the flow of ore in the distributing chutes, to assist in mixing large and small pieces of ore for the sintering process. Walker, in 1934 (U.S. Pat. No. 1,955,038), in his apparatus for handling material, used a series of vanes, spaced near and along each side of his chute, to maintain the initial mixture of materials as it passed through the chute.

A conical deflector again appears in Winter's patent of 1966 (U.S. Pat. No. 3,232,416). In his distributor for a conveyor, he utilizes a vertical half frustrum of a right circular cone as a distributor. His purpose was to deliver a uniform mixture of large and small pieces to the conveyor. Spout deflectors having radiating baffles first appeared in Socha's distributing spout in 1968 (U.S. Pat. No. 3,409,187). He used baffles, which inclined and criss-crossed, to direct the flow of grain. However, unlike the present invention, he made no attempt to segregate portions of the fines.

Cymara's patent of 1971 (U.S. Pat. No. 3,572,523) reveals the use of deflectors to obtain uniform filling of silos. Unlike the present invention, there is no attempt at segregation of the grain. Similarly, in 1983, Burkner's process and device for distribution of a conveyed flow (U.S. Pat. No. 4,377,230), utilizes an angled plate to feed the flow to the rake-like distributor, but no attempt was made to segregate out any specific portion of the feed, as does the present invention.

As can be seen in the prior art, baffles and deflectors have been used many times to achieve a more homogenous mixture, contrary to the purpose of the present invention, to segregate the grains. In the present invention, baffles and deflectors are primarily used to direct the flow of grain to particular locations in the hopper rail car or truck. Baffles and screens are used in the present invention to segregate the qualities of grain and deflectors are used to direct the flow of the segregated grains to particular locations in the hopper rail car or truck.

Prior art known to this inventor include the following U.S. Pat. Nos.

| | | |
|---|---|---|
| 832,400 | 10/1906 | Lyons |
| 1,047,316 | 12/1912 | Sicka |
| 1,955,038 | 4/1934 | Walker et al. |
| 3,232,416 | 2/1966 | Winter |
| 3,409,187 | 11/1968 | Socha |
| 3,572,523 | 3/1971 | Cymara |
| 4,377,230 | 3/1983 | Burkner |

SUMMARY OF THE INVENTION

The present invention is a load out spout apparatus for controlling the segregation and distribution of grain while loading an open top hopper rail car (Big John) or truck. The apparatus attaches permanently to the load out spout of most standard grain loaders. The apparatus was designed to more evenly distribute the smaller materials when loading a hopper rail car or truck and to avoid the buildup of small materials just beneath the load out spout during the loading process. The buildup of the core of small materials in the prior art constituted a safety hazard, due to the heat generated, and caused economic loss to sellers of grain because samples taken along the middle of the car or truck were not truly representative of the quality of the grain.

According to the preferred embodiments of this invention, the load out apparatus for loading hopper rail cars comprises:

chamber means for conveying the grain from a load out spout to the hopper rail car or truck, and input means for attaching the apparatus to the load out spout of a grain loader, and flow guide means for directing and slowing the movement of the grain through the apparatus, and screening means for segregating the grain into whole grain and small materials, and deflector means for directing the distribution of the small materials within the hopper rail car or truck being loaded, and whole grain output means for directing the output of the whole grain from the apparatus, and small materials output means for directing the output of the small materials from the apparatus.

Chamber means is a a stove-shaped chamber housing the flow guide means, the screening means, the deflecting means and the whole grain and the small materials output means. Input means is a circular adapter which fastens the apparatus to the load out spout of most standard grain loaders.

In the preferred embodiment of the model of the present invention for loading hopper rail cars, flow guide means is a series of baffles attached at a downward angle to the inside surfaces of the chamber. Screening means is a cone screen permanently mounted in the upper center of the chamber and two diagonal screens slidably mounted in channels at a 45 degree angle to the horizontal plane of the chamber, which diagonal screens are removable through access slots in the rear of the chamber. Deflector means is a solid metal deflector, shaped like an inverted V, centered on the bottom of the chamber with its deflecting surfaces running the length of the chamber and respectively facing to the sides of the hopper rail car being loaded. Whole grain output means are two discharge ports in the surface of the chamber, respectively opposite the diagonal screens, to permit the outflow of the whole grain from the front and the rear of the chamber along its path of movement. Small materials output means are discharge ports in the surface of the chamber, immediately above the respective deflecting surfaces of the deflector means, to permit the outflow of the small materials from both sides of the chamber.

In the preferred embodiment of the model of the present invention for loading trucks, screening means is a single diagonal screen permanently mounted near the center of that particular chamber at a 45 degree angle to the horizontal plane of the chamber, inclined downwardly from the back to the front of the chamber. Flow guide means, in this model of the present invention, are two baffles attached, above the single diagonal screen, to the inside surfaces of the chamber at a downward angle, to direct the flow of the grain more evenly over the screening means. Deflector means is a single baffle, attached to both sides of the chamber, positioned below the single diagonal screen, to deflect the majority of the small materials to the small materials output means. Whole grain output means is a single discharge port in the surface of the chamber, opposite the single diagonal screen, to permit the outflow of the whole grain from the front of the chamber. Small materials output means is a single discharge port in the bottom of the chamber to permit the outflow of the small materials into the bed of the truck being loaded.

OBJECTIVES OF THE INVENTION

The objectives of the present invention are to provide a load out spout apparatus, for controlling the segregation and distribution of grain, which:

(1) will handle up to 5000 bushels of grain per hour;

(2) will distribute small materials on a more even basis than loading devices of the prior art;

(3) will prevent the buildup of small materials directly beneath the load out spout;

(4) is readily attachable to the load out spout of most standard grain loaders;

(5) is compact in size and unitary in design to permit less costly installation and maintenance;

(6) is constructed with no moving parts so as to provide more reliable operation and less maintenance under heavy usage conditions;

Other objectives and advantages of the present invention will be apparent during the course of the following detailed description.

DETAILED DESCRIPTION OF THE PREFERRED EMBODIMENTS OF THE PRESENT INVENTION

Figure 1:
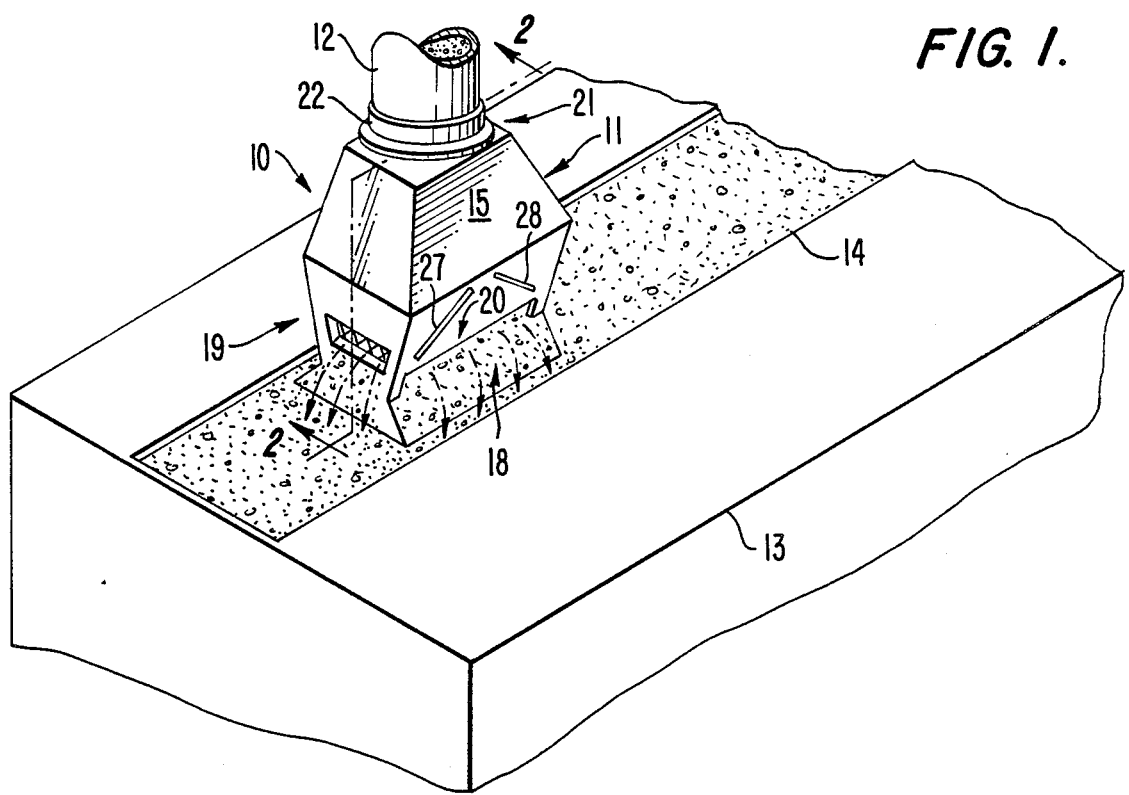
FIG. 1 is a fragmentary perspective view, from the left rear, of a load out spout apparatus, for loading hopper rail cars, constructed in accordance with the principles of the present invention. Shown are the circular adapter, the exterior of the stove-shaped chamber and the discharge ports for the whole grain and for the small materials.

The load out spout apparatuses of the present invention are compact, relatively small units, which permanently attach to the load out spout line of most standard grain loaders. Throughout the following detailed description of the present invention, like reference numerals are used to denote like parts disclosed in the accompanying drawings, FIGS. 1-6.

As shown in FIG. 1, the load out spout apparatus for loading hopper rail cars, shown generally at reference numeral 10, is designed so that all of its major components are housed in chamber means, shown generally at reference numeral 11. Chamber means 11 conveys the grain from load out spout 12 to hopper rail car 13 which has an open top 14, used for access to hopper rail car 13. Open top 14 runs the length of hopper rail car 13 and is about 25 inches wide. Chamber means 11 is preferably made of black steel or some lighter metal and weighs about 225 pounds. Chamber means 11 is a stove-shaped chamber 15 housing flow guide means, shown generally in FIG. 2 at reference numeral 16, screening means, shown generally at reference numeral 17, deflector means, shown generally at reference numeral 18, whole grain output means, shown generally at reference numeral 19 and small materials output means, shown generally at reference numeral 20.

Figure 2:
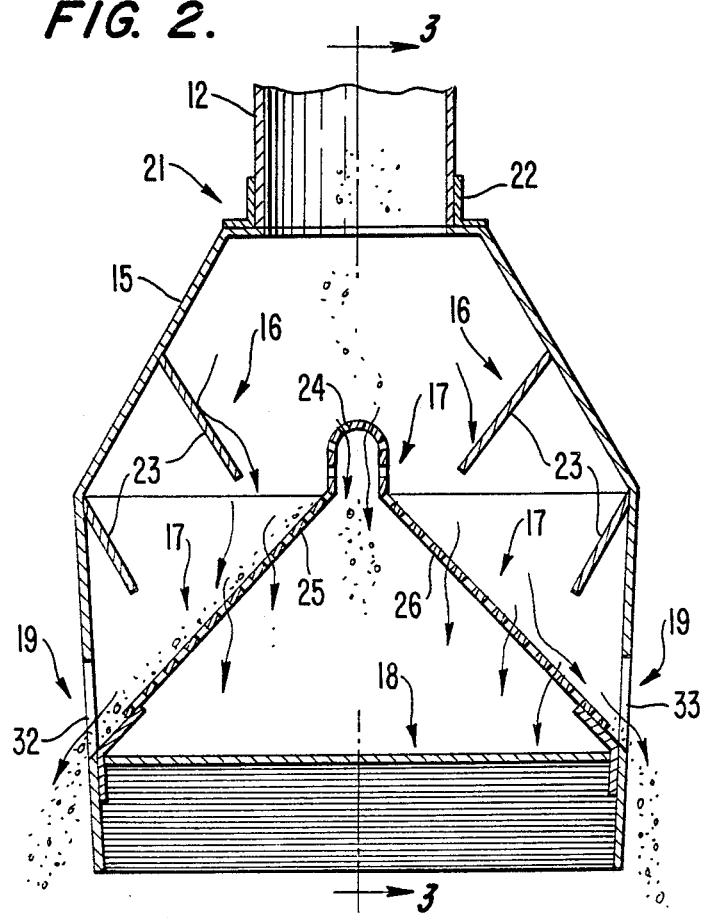
FIG. 2 is a rear sectional view of the same model of the present invention taken substantially along line 2—2 of FIG. 1, from the direction of the arrows, showing the arrangement of the baffles, the cone screen, the two diagonal screens and the solid metal deflector.
Figure 3:
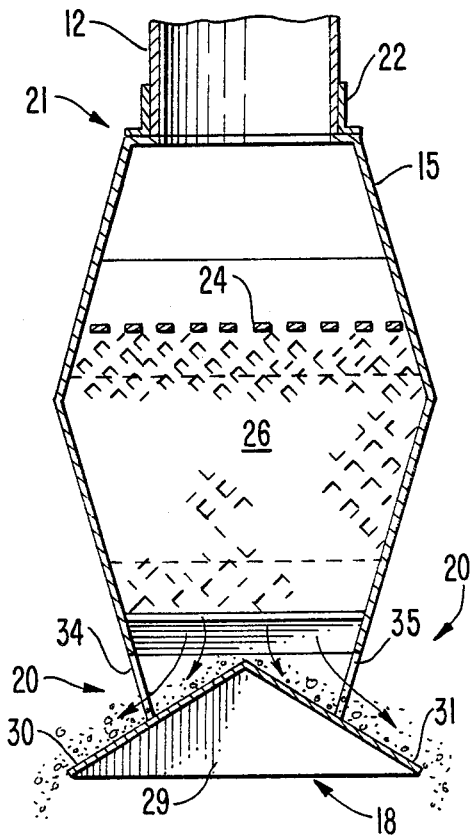
FIG. 3 is a side sectional view of the same model of the present invention taken along line 3—3 in FIG. 2, from the direction of the arrows. Shown is the interior of the chamber, the cone screen, one of the diagonal screens and the solid metal deflector for distributing the small materials.

As shown in FIGS. 1-3, load out spout apparatus 10 has input means, shown generally at reference numeral 21, for permanently attaching load out spout apparatus 10 to load out spout 12 of a grain loader (not shown). Load out spouts, such as load out spout 12, have a flexible joint (not shown) higher up on the spout line to facilitate guiding load out spout 12 in and out of open top 14 and up and down the length of hopper rail car 13 during the loading process. Input means 21 is a circular adapter 22, which is made of steel and fastens load out spout apparatus 10, to the load out spout 12 of most standard grain loaders. The load out spouts of different standard grain loaders are usually circular so circular adapter 22 need only be increased or decreased in circumference, to adapt to the particular load out spout 12. The collar and flange of circular adapter 22 are permanently welded respectively to load out spout 12 and to the top of chamber 15.

Load out spout apparatus 10 has flow guide means 16 for directing and slowing the movement of the grain through the apparatus. Flow guide means 16 is a series of baffles 23, preferably made of steel, attached at a downward angle to the inside surfaces of chamber 15 and which extend the depth of chamber 15 from front to back. Load out spout apparatus 10 also has screening means 17 for segregating the grain into whole grain and small materials. Screening means 17 is cone screen 24 permanently mounted in the upper center of chamber 15 and two diagonal screens 25 and 26 which screens are slidably mounted in channels (not shown) at a 45 degree angle to the horizontal plane of chamber 15. Diagonal screens 25 and 26 are removable through access slots 27 and 28, respectively, in the rear panel of chamber 15. Cone screen 24 is shaped like an inverted U and is made of expanded metal screening. Cone screen 24 extends the full depth of chamber 15, front to back, and is permanently attached to the front and back interior walls of chamber 15. Diagonal screens 25 and 26 are also made of expanded metal screening and extend across the depth of chamber 15 from the base of cone screen 24 to the bottom of chamber 15. When grain strikes cone screen 24, approximately 50 per cent of grain disperses to the left and right, dropping on diagonal screens 25 and 26. The whole grain, being larger, stays on top of diagonal screens 25 and 26, rolling downwardly, while the small material, being smaller, drops through diagonal screens 25 and 26 towards the bottom of chamber 15.

Load out spout apparatus 10 has a deflector means 18 for directing the distribution of the small materials within hopper rail car 13. Deflector means 18 is a solid metal deflector 29, shaped like an inverted V, centered on the bottom of chamber 15. Its deflecting surfaces 30 and 31 run the length of chamber 15 and respectively face to the sides of hopper rail car 13 during loading if load out spout apparatus 10 is kept in the proper position as shown in FIG. 1. Load out spout apparatus 10 also has a whole grain output means 19 for directing the output of the whole grain from the apparatus. Whole grain output means 19 are two discharge ports 32 and 33 in the surface of chamber 15 respectively opposite diagonal screens 25 and 26, to permit the outflow of the whole grain from the sides of chamber 15 along its path of movement, as shown in FIG. 1. Similarly, load out spout apparatus 10 has small materials output means 20 for directing the output of the small materials from the apparatus. Small materials output means 20 are discharge ports 34 and 35 in the surface of chamber 15, immediately above the respective deflecting surfaces 30 and 31 of deflector means 18.

Figure 4:
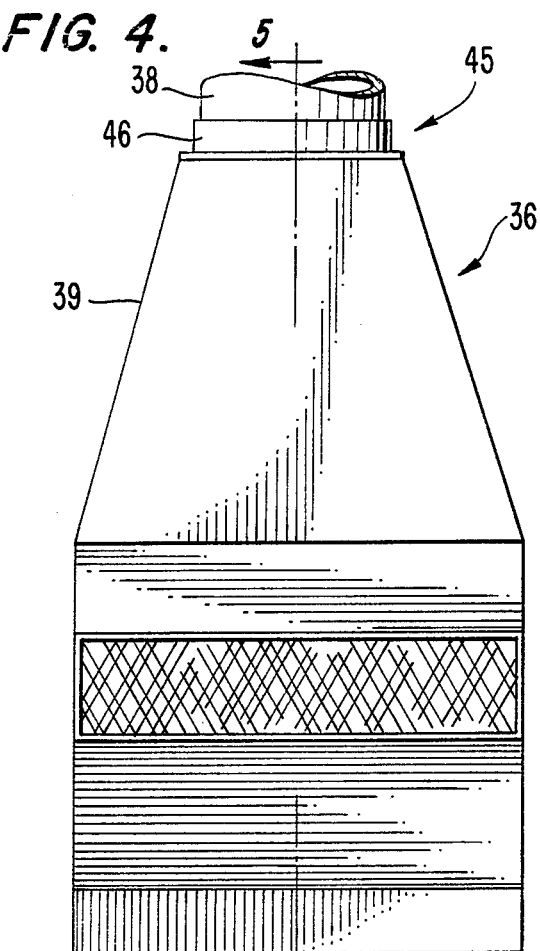
FIG. 4 is a front elevational view of a load out spout apparatus, for loading trucks, constructed in accordance with the principles of the present invention, showing the circular adapter, the exterior of the chamber and the discharge port for the whole grain.

As shown in FIG. 4, the load out spout apparatus for loading trucks, shown generally at reference numeral 36, is designed so that all of its major components are housed in chamber means, shown generally at reference numeral 37. Chamber means 37 conveys the grain from load out spout 38 to an open truck below (not shown). Chamber means 37 is preferably made of black steel or some lighter metal and is a stove-shaped chamber 39 housing flow guide means, shown generally in FIG. 5 at reference numeral 40, screening means, shown generally at reference numeral 41, deflector means, shown generally at reference numeral 42, whole grain output means, shown generally at reference numeral 43, and small material output means, shown generally at reference numeral 44.

Figure 5:
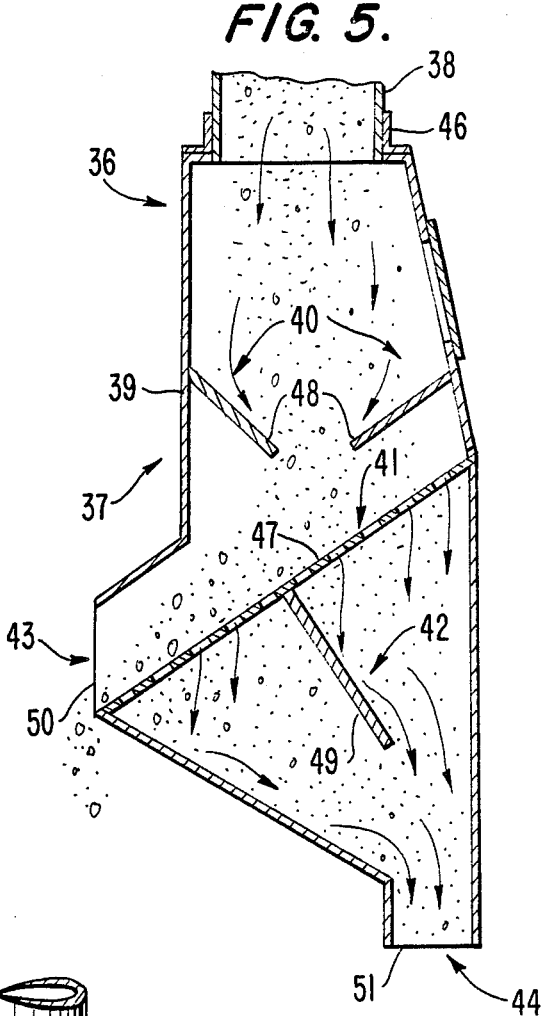
FIG. 5 is a side sectional view of the same model of the present invention, taken along line 5—5 of FIG. 4, from the direction of the arrows. Shown is the interior of the chamber, the single diagonal screen and the discharge port for the small materials.
Figure 6:
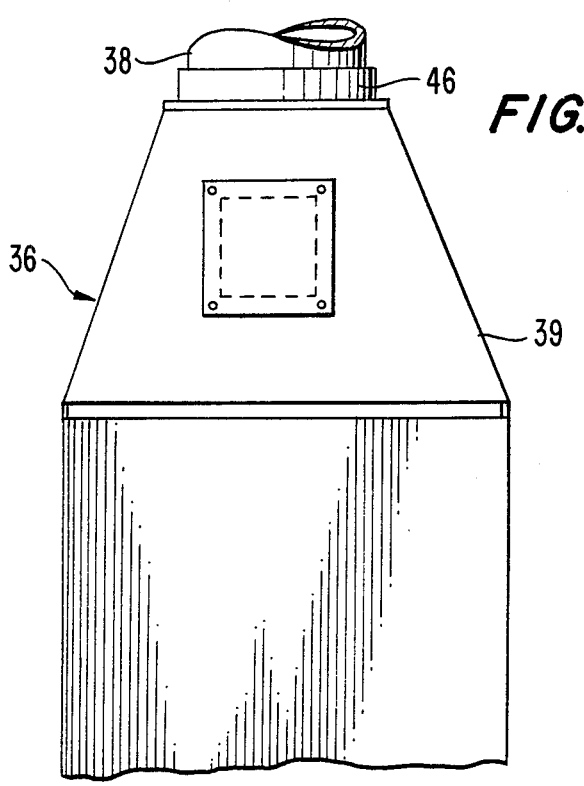
FIG. 6 is a rear elevational view of the same model of the present invention showing the inspection plate for access to the upper portion of the chamber.

As shown in FIGS. 4–6, load out spout apparatus 36, for loading trucks, has input means, shown generally at reference numeral 45, for permanently attaching load out spout apparatus 36 to load out spout 38 of a grain loader (not shown). As mentioned earlier, load out spouts, such as load out spout 38, have a flexible joint (not shown) higher up on the spout line to facilitate guiding load out spout 38 in and out of the open top of the truck (not shown), and up and down the length of the truck, during the loading process. Input means 45 is a circular adapter 46 which is made of steel and fastens load out spout apparatus 36 to the load out spout 38 of most standard grain loaders. The load out spouts of different standard grain loaders are usually circular so circular adapter 46 need only be increased or decreased in circumference to adapt to the particular load out spout 38. The collar and flange of circular adapter 46 are permanently welded respectively to load out spout 38 and the top of chamber 39.

Load out spout apparatus 36 for loading trucks has screening means 41 for segregating the grain into whole grain and small materials. Screening means 41 is a single diagonal screen 47, made of expanded metal screening, permanently mounted near the center of chamber 39 at a 45 degree angle to the horizontal plane of chamber 39, inclined downwardly from the back to the front of the chamber. This model of the present invention also has flow guide means 40 for directing and slowing the movement of the grain through load out spout apparatus 36. Flow guide means 40 are two baffles 48, made of steel and attached, above single diagonal screen 47, at a downward angle to the inside surfaces of chamber 39, to direct the flow of the grain more evenly over screening means 41.

Load out spout apparatus 36, for loading trucks, has deflector means 42, for directing the distribution of the small materials within the truck being loaded (not shown). Deflector means 42 is a single baffle 49, attached to both sides of chamber 39, and positioned below single diagonal screen 47, to deflect the majority of the small materials to the small material output means 44. This apparatus also has a whole grain output means 43 for directing the output of whole grain from the apparatus. Whole grain output means 43 is a single discharge port 50 in the surface of chamber 39, opposite single diagonal screen 47, to permit the outflow of the whole grain from the front of chamber 39. This model of the present invention also has a small materials output means 44 for directing the output of the small materials from the apparatus. Small materials output means 44 is a single discharge port 51 in the bottom of chamber 39, to permit the outflow of the small materials into the bed of the truck being loaded (not shown).

I claim:

1. Load out spout apparatus for controlling the segregation and distribution of grain while loading an open top hopper rail car or truck which comprises:
   a stove-shaped chamber, for conveying said grain from a load out spout to said hopper rail car or truck,
   a circular adapter which fastens said apparatus to the load out spout of most standard grain loaders,
   a series of baffles, attached at a downward angle to opposed inside surfaces of said chamber, for directing and slowing the movement of said grain through said apparatus, a cone screen, permanently mounted in the upper center of said chamber, and two diagonal screens, slidably mounted at 45 degree angles to the horizontal plane of said chamber, which diagonal screens are removable through access slots in the rear of said chamber, said screens segregating said grain into whole grain and small materials, deflector means attached to said chamber, for directing the distribution of said small materials to within said hopper rail car or truck being loaded, whole grain output means on said chamber for directing the output of said whole grain from said apparatus, and small materials output means on said chamber for directing the output of said small materials from said apparatus.

2. The apparatus of claim 1 wherein said deflector means is a solid metal deflector, shaped like an inverted V, centered on the bottom of said chamber with its deflecting surfaces running the length of said chamber and respectively facing to the sides of the hopper rail car being loaded.

3. The apparatus of claim 2 wherein said whole grain output means are two discharge ports in opposed surfaces of said chamber, respectively opposite said diagonal screens, to permit the outflow of said whole grain from the front and the rear of said chamber along its path of movement.

4. The apparatus of claim 3 wherein said small materials output means are two discharge ports in opposed surfaces of said chamber, immediately above the respective deflecting surfaces of said deflector means, to permit the outflow of said small materials from both sides of said chamber.

* * * * *